United States Patent [19]
Gochenour

[11] Patent Number: 6,062,365
[45] Date of Patent: May 16, 2000

[54] AUTOMATICALLY ADJUSTING FRICTION CLUTCH WITH OVER ADJUSTMENT PROTECTION

[75] Inventor: Daniel V. Gochenour, Auburn, Ind.

[73] Assignee: Eaton Corporation, Cleveland, Ohio

[21] Appl. No.: 09/229,271

[22] Filed: Jan. 13, 1999

[51] Int. Cl.$^7$ .................................................. F16D 13/54
[52] U.S. Cl. .................................. 192/70.25; 192/111 A; 192/30 W; 192/89.21
[58] Field of Search ............................. 192/111 A, 70.25, 192/53.1

[56] References Cited

U.S. PATENT DOCUMENTS

| | | | |
|---|---|---|---|
| 4,191,285 | 3/1980 | Thelander, Sr. et al. | 192/111 A |
| 4,207,972 | 6/1980 | Zeidler | 192/111 A |
| 4,228,883 | 10/1980 | Palmer | 192/111 A |
| 5,069,322 | 12/1991 | Mizukami et al. | 192/70.25 |
| 5,377,803 | 1/1995 | Link et al. | 192/111 A |
| 5,404,979 | 4/1995 | Craft et al. | 192/70.25 |
| 5,419,418 | 5/1995 | Uenohara et al. | 192/70.25 |
| 5,450,934 | 9/1995 | Maucher | 192/70.25 |
| 5,494,143 | 2/1996 | Simmonds | 192/70.25 |
| 5,513,735 | 5/1996 | Uenohara | 192/111 A |
| 5,531,308 | 7/1996 | Gochenour et al. | 192/70.25 |
| 5,560,463 | 10/1996 | Link et al. | 192/70.25 |
| 5,595,274 | 1/1997 | Gochenour et al. | 192/70.25 |
| 5,645,154 | 7/1997 | Weidinger | 192/70.25 |
| 5,690,203 | 11/1997 | Link et al. | 192/70.25 |

OTHER PUBLICATIONS

U.S. Pat. application Ser. No. 08/748,702 entitled "Automatically Adjusting Friction Clutch with Cam Locating Fingers" filed on Nov. 13, 1996.

*Primary Examiner*—Rodney H. Bonck
*Assistant Examiner*—Tisha D. Waddell
*Attorney, Agent, or Firm*—Dykema Gossett PLLC

[57] ABSTRACT

An adjustment mechanism for a frictional clutch includes a pressure plate, a first annular cam member, a second annular cam member, a cam spring and an adjustment limiting mechanism. The pressure plate includes an axis of rotation and an engagement surface substantially normal to the axis of rotation. The first annular cam member is concentric with the axis of rotation and has a plurality of first ramped cam surfaces. The first annular cam member is rotatably fixed with respect to the pressure plate. The second annular cam member is rotatable relative to the first annular cam member and has a plurality of second ramped cam surfaces in engagement with the first ramped cam surfaces. The second annular cam member, together with the first annular cam member defines an effective pressure plate thickness relative to the engagement surface. The cam spring is connected with the cam member and rotatably biases the cam members toward an increased cam height. The adjustment limiting mechanism includes a first plurality of pins, an annular adjusting ring, and a first plurality of pin receiving members. The first plurality of pins extends axially from a side of the pressure plate opposite the engagement surface. The annular adjusting ring is concentric with the axis of rotation. The first plurality of pin receiving members is fixed to the adjusting ring and slidably receives the first plurality of pins.

9 Claims, 5 Drawing Sheets

AUTOMATICALLY ADJUSTING FRICTION CLUTCH WITH OVER ADJUSTMENT PROTECTION

FIELD OF THE INVENTION

This invention relates to the field of friction clutches and more particularly to friction clutches having automatic adjustment mechanisms.

BACKGROUND OF THE INVENTION

Known friction clutches provide a releasable torsional connection between a motor vehicle engine flywheel and an associated transmission. Repeated clutch disengagement and engagement cycles wear the friction material of the clutch driven disc. The wear results in an axial shift of the pressure plate's position toward the flywheel in the engaged condition. The axial shift commonly decreases the clutch engagement force or clamping load.

Some clutches are commonly provided with an adjustment mechanism which automatically compensates for driven disc wear and maintains the clutch engagement force. Some automatic adjustment mechanisms are disposed between the pressure plate and an associated biasing member such as a diaphragm spring. The biasing member acts against the adjustment mechanism to bias the pressure plate toward the flywheel. The clutch engagement force developed by the biasing member prevents adjustment of the adjustment mechanism in the engaged condition. When the clutch is released, the clutch engagement force is eliminated, enabling automatic adjustment of the clutch. However, over adjustment can occur.

It is known to provide adjustment limiters in the form of finger elements connected to the pressure plate. The fingers limit the travel of the adjusting feature relative to the pressure plate. As the driven disc wears, the fingers are forced further out, allowing the adjustment mechanism to further adjust. However, the finger elements have several disadvantages. One disadvantage is that the effectiveness of the fingers depends on the dimensions of the fingers, the dimensions of the pressure plate, and the dimensions adjustment mechanism components. The interdependence of these parts makes it difficult to provide assemblies with optimally compatible component dimensions.

Another disadvantage of finger systems is that the fingers may not properly compensate for wear of the driven disc. The fingers engage the adjustment mechanism at a location radially offset from where the adjustment mechanism is engaged by the spring. Any axial deflection or wear of the adjustment mechanism which changes the axial distance between the spring and finger engagement locations will resultantly either decrease the pressure plate departure distance or decrease the clutch engagement force.

Another disadvantage of the finger system is that the flywheel surface engaged by the ends of the fingers which pass through the pressure plate must be a flat, controlled surface. Otherwise, the fingers will not be displaced equally, and may allow the adjusting mechanisms to cock, or may result in an incorrect adjustment.

Yet another disadvantage of a finger system is that the fingers are in the immediate vicinity of the frictional engagement surface of the pressure plate where a significant amount of heat is generated during clutch engagements. This heat may affect the operation of the fingers.

It is desired to provide a clutch having an adjustment mechanism with a travel limiter relatively insensitive to dimensional variations of the pressure plate and the adjustment mechanism.

It is desired to provide a clutch having an adjustment mechanism with a travel limiter which is relatively insensitive to deflection or wear.

It is desired to provide a clutch having an adjustment mechanism with a travel limiter which is relatively insensitive to variations of the flywheel surface characteristics.

It is desired to provide a clutch having an adjustment mechanism with a travel limiter which is relatively insensitive to temperature increase of the pressure plate.

SUMMARY OF THE INVENTION

An adjustment mechanism for a frictional clutch includes a pressure plate, a first annular cam member, a second annular cam member, a cam spring and an adjustment limiting mechanism. The pressure plate includes an axis of rotation and an engagement surface substantially normal to the axis of rotation. The first annular cam member is concentric with the axis of rotation and has a plurality of first ramped cam surfaces. The first annular cam member is rotatably fixed with respect to the pressure plate. The second annular cam member is rotatable relative to the first annular cam member and has a plurality of second ramped cam surfaces in engagement with the first ramped cam surfaces. The second annular cam member, together with the first annular cam member defines an effective pressure plate thickness relative to the engagement surface. The cam spring is connected with the cam member and rotatably biases the cam members toward an increased cam height. The adjustment limiting mechanism includes a first plurality of pins, an annular adjusting ring, and a first plurality of pin receiving members. The first plurality of pins extends axially from a side of the pressure plate opposite the engagement surface. The annular adjusting ring is concentric with the axis of rotation. The first plurality of pin receiving members is fixed to the adjusting ring and slidably receives the first plurality of pins.

A frictional clutch for a motor vehicle includes a cover, a pressure plate, a diaphragm spring, an adjusting mechanism, and an adjustment limiting mechanism. The cover has an axis of rotation. The pressure plate is coupled to the cover for rotation therewith about the axis of rotation and has a frictional engagement surface substantially normal to the axis. The diaphragm spring is interposed between the cover and to the pressure plate. The diaphragm spring is selectively moveable between engaged and disengaged positions. In the engaged position, the diaphragm spring biases the pressure plate to an engaged position. The adjusting mechanism includes a first annular cam member, a second annular cam member and a cam spring. The first annular cam member is centered about the axis and is axially disposed between the pressure plate and the diaphragm spring. The second annular cam member is centered about the axis and has a plurality of second ramped cam surfaces engaging the first ramped cam surfaces. The engaged cam members are axially disposed between the pressure plate and the diaphragm spring. The engaged cams define an effective thickness of the pressure plate from the frictional engagement surface to an engagement feature of the second annular cam. The effective thickness increases with the relative rotation of the cam members in a first direction. The cam spring is connected with the cam members and induces relative rotation therebetween in the first direction. The annular fulcrum is concentric with the axis and is axially disposed between the adjusting mechanism and the diaphragm spring.

The adjustment limiting mechanism includes a first plurality of pins, an annular adjusting ring and a first plurality of pin receiving members. The first plurality of pins extends axially from side of the pressure plate opposite the engagement surface. The annular adjusting ring is concentric with the axis of rotation. The pin receiving members are fixed to adjusting ring and slidably receive the first plurality of pins. A plurality of engagement tips is disposed on the adjusting ring. The engagement tips are substantially aligned with the annular fulcrum.

A frictional clutch for a motor vehicle includes a clover, a pressure plate, a diaphragm spring, an adjusting means, and an adjustment limiting mechanism. The cover has an axis of rotation. The pressure plate is coupled to the cover for rotation therewith about the axis of rotation. The pressure plate has a frictional engagement surface substantially normal to the axis. The diaphragm spring is interposed between the cover and the pressure plate and is selectively moveable between engaged and disengaged positions. The diaphragm spring, when in the engaged position, biases the pressure plate to an engaged pressure plate position. The adjusting means maintains a constant spring engagement force against the pressure plate in an engaged condition and is axially disposed between the pressure plate and the diaphragm spring. The adjustment limiting mechanism includes a first plurality of pins, an annular adjusting ring, a first plurality of pin receiving members and a plurality of engagement tips. The first plurality of pins extend axially away from a side of the pressure plate opposite the engagement surface. The annular adjusting ring is concentric with the axis of rotation. The pin receiving members are fixed to the adjusting ring and slidably receive the first plurality of pins. The engagement tips are disposed on the adjusting ring and operably engage the diaphragm spring.

A travel limiter for a clutch is disclosed which is relatively insensitive to dimensional variations of the pressure plate and the adjustment mechanism.

A travel limiter for a clutch adjustment mechanism is disclosed which is relatively insensitive to deflection and wear.

A travel limiter for a clutch adjustment mechanism is disclosed which is relatively insensitive to flywheel surface characteristic variations.

A disclosed travel limiter for a clutch adjustment mechanism is relatively insensitive to temperature increases of the pressure plate.

DESCRIPTION OF PREFERRED EMBODIMENTS

Figure 1:
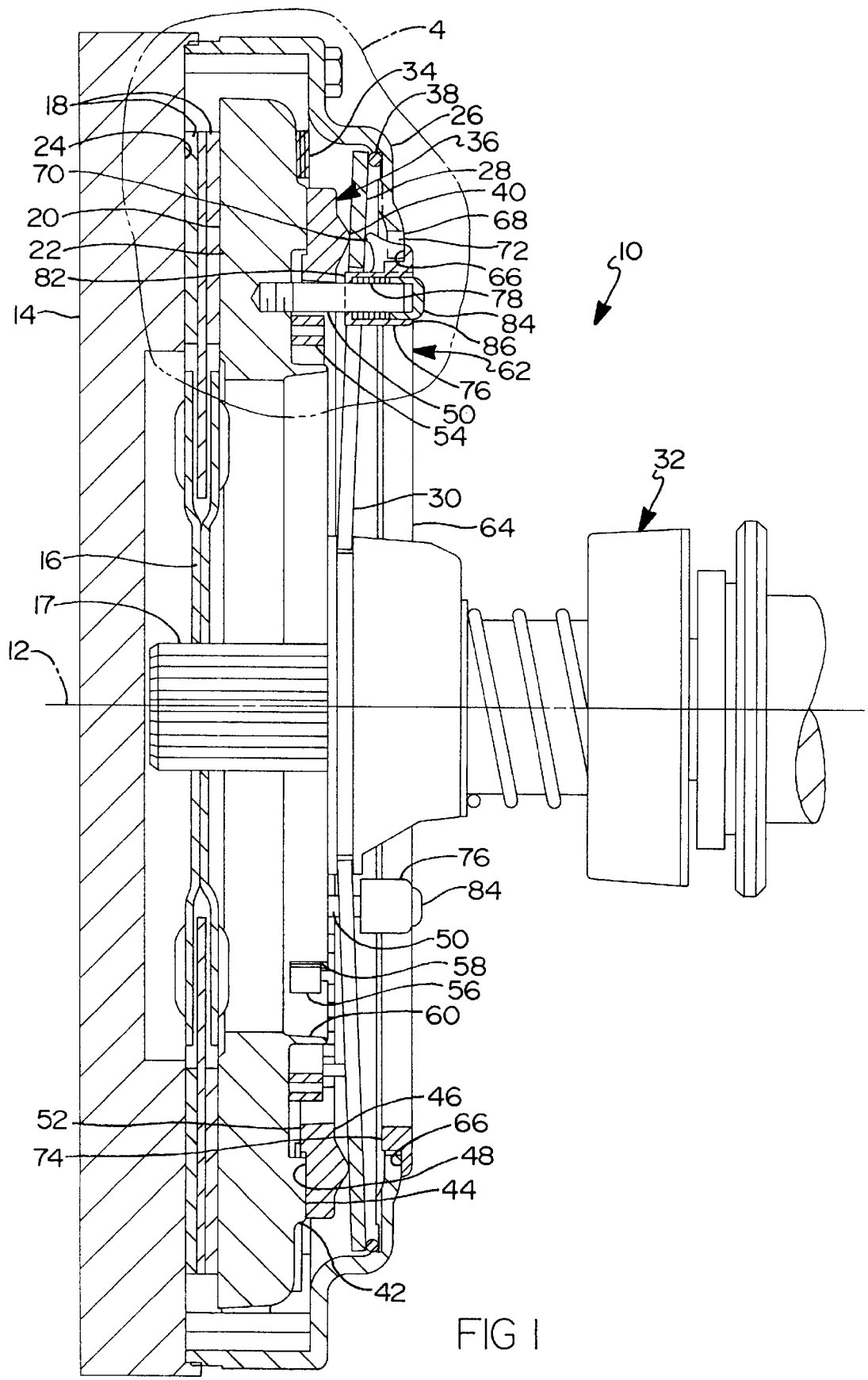
FIG. 1 is a sectional side view of an exemplary clutch.
Figure 2:
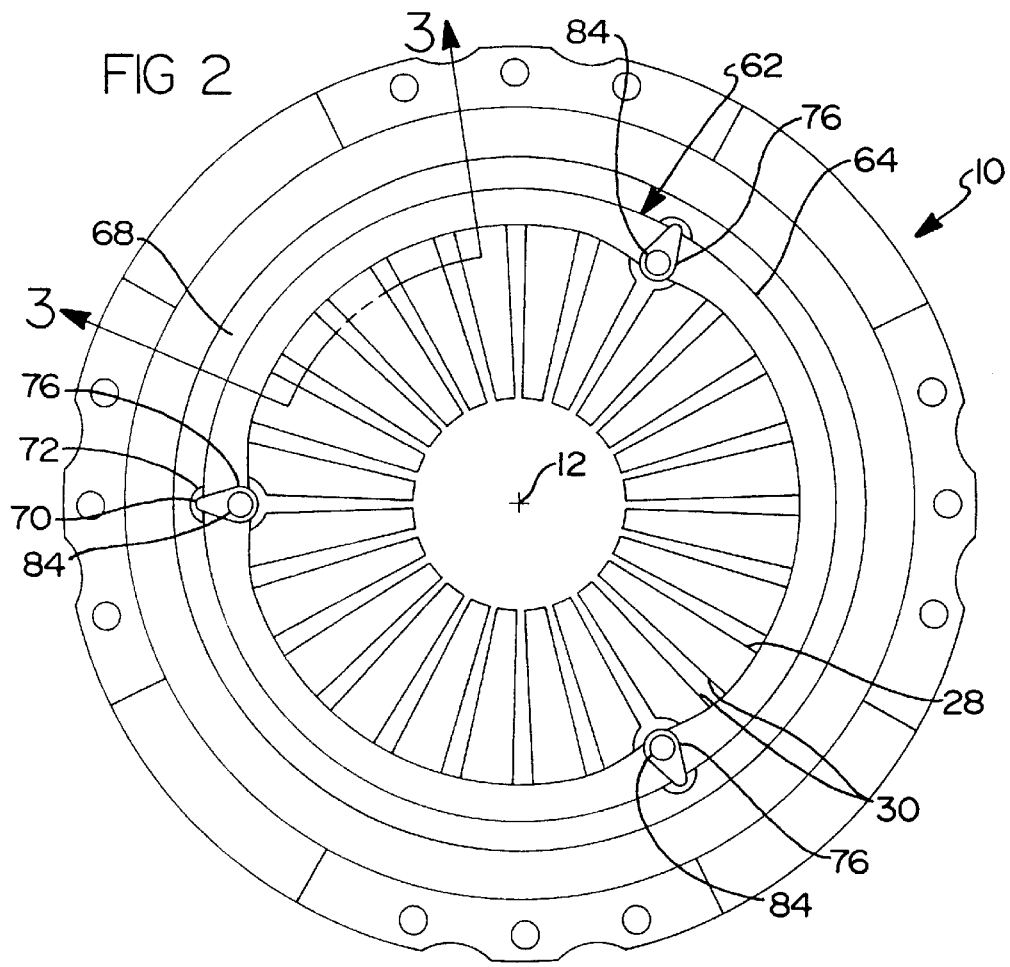
FIG. 2 is an axial end view of the clutch of FIG. 1.
Figure 9:
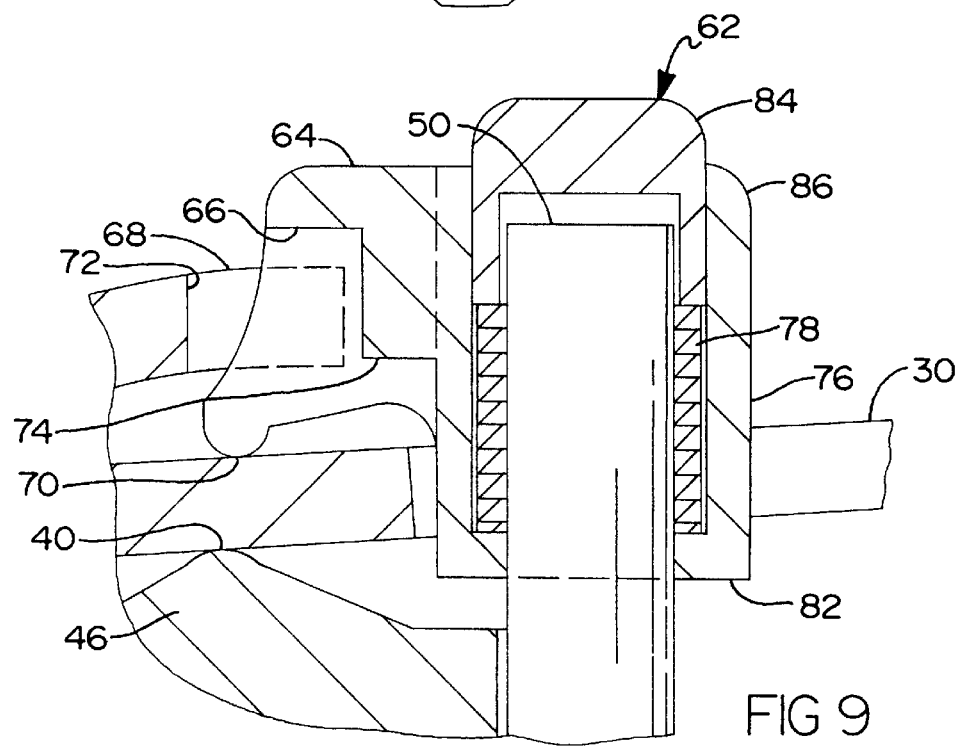
FIG. 9 is a view of a portion of the clutch shown in FIG. 7, yet further enlarged.

A frictional clutch 10 for a motor vehicle is shown in FIG. 1 and FIG. 2. Clutch 10 rotates about axis 12. A flywheel 14, best shown in FIG. 1, is rotatably fixed to an output shaft of a motor vehicle engine (not shown). A driven disc 16 centered with respect to axis 12, has a hub which slidably engages an input shaft 17 of the motor vehicle transmission. A friction element 18 of driven disc 16 is engaged by an engagement surface 20 of pressure plate 22 on one side and by an engagement surface 24 of flywheel 14 on the other side.

A cover 26 is disposed over pressure plate 22 and is fixed to flywheel 14. A diaphragm spring 28 with a plurality of radially inwardly extending fingers 30 serves as a biasing member, and is disposed between cover 26 and pressure plate 22. Spring 28 forces pressure plate 22 against driven disc 16 which in turn is pressed against flywheel engagement surface 24 in an engaged condition. Fingers 30 of diaphragm spring 28 have their inner tips axially engaged by a release assembly 32. Clutch 10 is selectively moved between engaged and released conditions by axially displacing release assembly 32 which resultantly deflects diaphragm spring 28. A potential alternative to diaphragm spring 28 is a plurality of clutch levers disposed between cover 26 and pressure plate 22, with either a diaphragm spring without fingers, or a plurality of coil springs, acting against the levers to bias pressure plate 22 toward flywheel 14. A plurality of straps or leaf springs 34 connect pressure plate 22 and cover 26, biasing plate 22 toward cover 26. An automatic adjustment mechanism 36 is disposed between pressure plate 22 and diaphragm spring 28.

Diaphragm spring 28 engages cover 26 indirectly by contact with a first or outer diameter pivot ring 38. First pivot ring 38 is disposed inside cover 26. At a location disposed radially inwardly of ring 38, diaphragm spring 28 engages a fulcrum 40 of adjustment mechanism 36.

Figure 3:
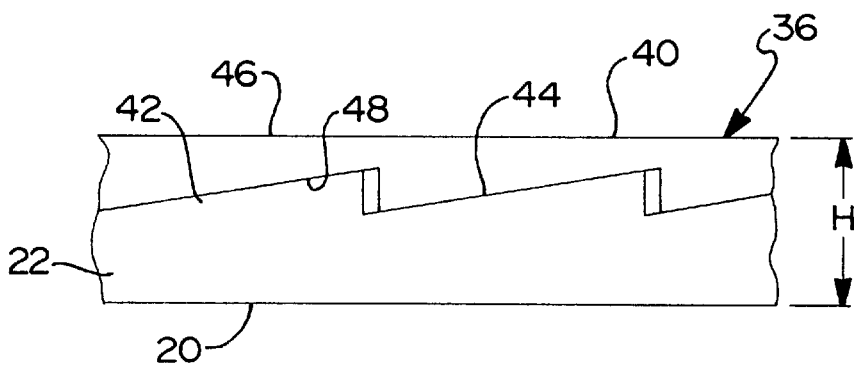
FIG. 3 is a sectional view of the clutch of FIG. 2 in the direction arrows 3.
Figure 6:
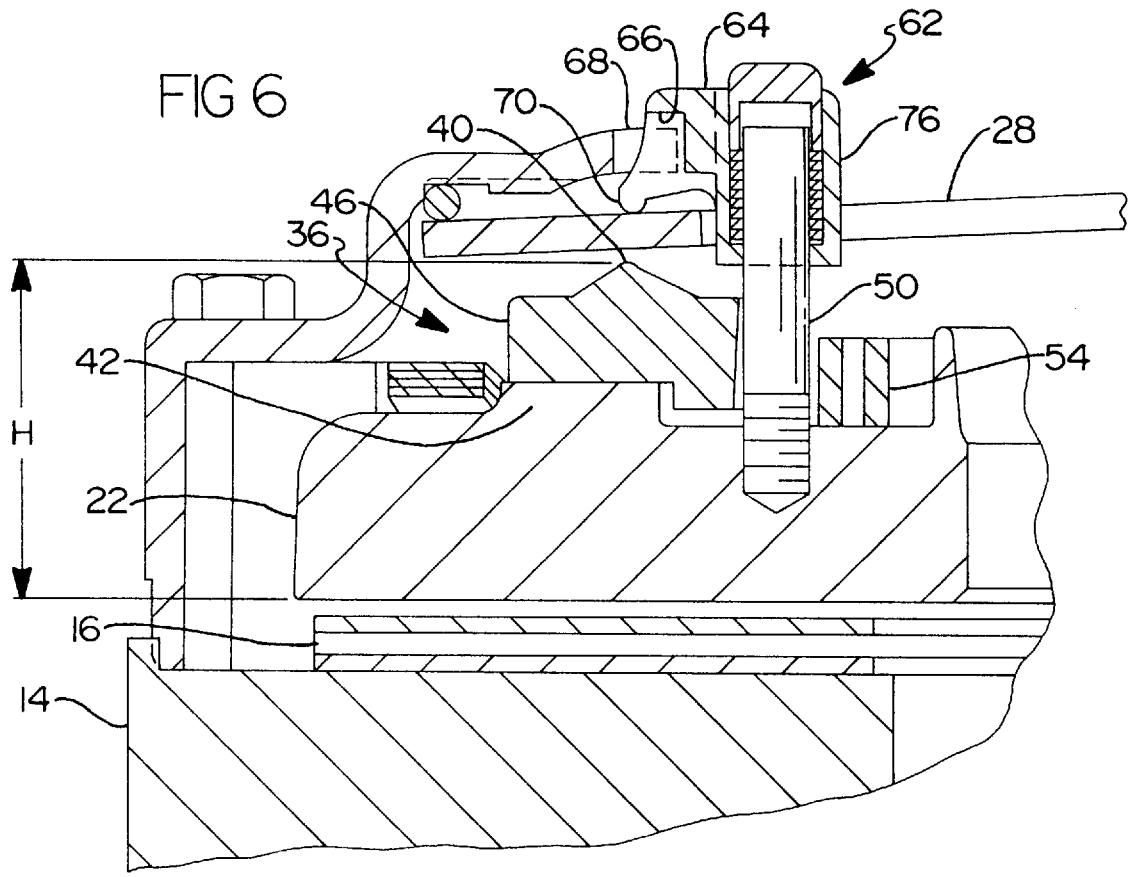
FIG. 6 is a view of the portion of the clutch shown in FIG. 4 in which the clutch is in a third condition.

Adjustment mechanism 40 includes a first or stationary annular cam 42 formed as one piece and integral or unitary with pressure plate 22. Alternatively, stationary annular cam 42 may be formed as a separate piece and disposed against pressure plate 22. Stationary annular cam 42 is concentric with axis 12. Cam 42 has a plurality of first ramped cam surfaces 44 on a side opposite pressure plate engagement surface 20. A second or rotating annular cam 46 is disposed over stationary annular cam 42. Rotating annular cam 46 is also concentric with axis 12. Rotating annular cam 46 has a plurality of second ramped cam surfaces 48 in engagement with first cam surfaces 44 as best seen in FIG. 3. Fulcrum 40 is formed as a single integral one piece unit with rotating annular cam 46. An effective pressure plate thickness H from engagement surface 20 to a top of fulcrum 40 is controlled by adjustment mechanism 36 as shown in FIGS. 3 and 6.

A plurality of cam alignment pins 50 are disposed radially within rotating annular cam 46 for engagement therewith to maintain cam 46 in concentric alignment with axis 12. Cam 46 is additionally or alternatively provided with a pilot shoulder 52 as shown in FIGS. 1 and 4–8 which helps maintain cam 46 concentric with respect to pressure plate 30.

A cam spring 54 is formed of flat wire like that used for clock springs. A first end (not shown) of cam spring 54 engages a radially inwardly extending spring hook (not shown) on rotating annular cam 46. A second end 56 of spring 54 is disposed in a notch 58 in a ring portion 60 of pressure plate 22, best shown in FIG. 1. As driven disc 16 wears, spring 54 unwinds, biasing cam 46 to a position of increased thickness H. Alternatively cam spring 54 is formed of round wire (not shown), and similarly disposed between stationary annular cam 42 and rotating annular cam 46, biasing the cam 46 in the direction tending to increase effective pressure plate thickness H from engagement surface 20 to fulcrum 40.

A mechanism 62 for limiting adjustment of automatic adjustment mechanism, and preventing over adjustment, 36 includes an adjusting ring 64, a bracket portion 66 of cover 26, and alignment pins 50.

Adjusting ring 64 has an engagement surface 66 which contacts a bracket portion 68 of cover 26 under certain conditions. Bracket portion 68 is a radial inward extension of cover 26. Radially outwardly disposed spring engagement tips 70 of ring 64 extend from ring 64 into contact with the annular portion of diaphragm spring 28. Spring engagement tips 70 engage diaphragm spring 28 substantially opposite and in radial alignment with fulcrum 40. Notches 72 formed on the inner diameter of bracket 68 to allow spring engagement tips 70 to extend past cover 26. A ring shoulder portion 74 extends axially from engagement surface 66 toward pressure plate 22.

Adjusting ring 64 has three cup portions, each of which receive one of the axially fixed alignment pins 50. A wrap spring 78 is disposed over each of alignment pins 50 within cup portion 76. Springs 78 exert a frictional force on pins 50. The interior of cup portion 76 is sufficiently large so that wrap springs 78 do not engage the interior. However, such clearance is not critical to the operation of the invention. A first end 82 of cup portion 76, through which alignment pin 50 passes, is sized to permit the passage of pin 50, but not wrap spring 78.

Erosion of the pins and/or springs could undesirably increase and axial force necessary to axially displace springs 78 axially along pins 50. A relatively close fit between first end 82 and pin 50 prevents dirt, debris and other contaminants from entering cup portion 82. Wrap spring 78 is disposed against first end 82. A cap 84 is disposed over a second end 86 of cup portion 76. Cap 84 prevents the intrusion of dirt, clutch debris and other contaminants from entering cup portion 76 at second end 86. Pins 50 are preferably made of a corrosion resistant material such as stainless steel.

Figure 4:
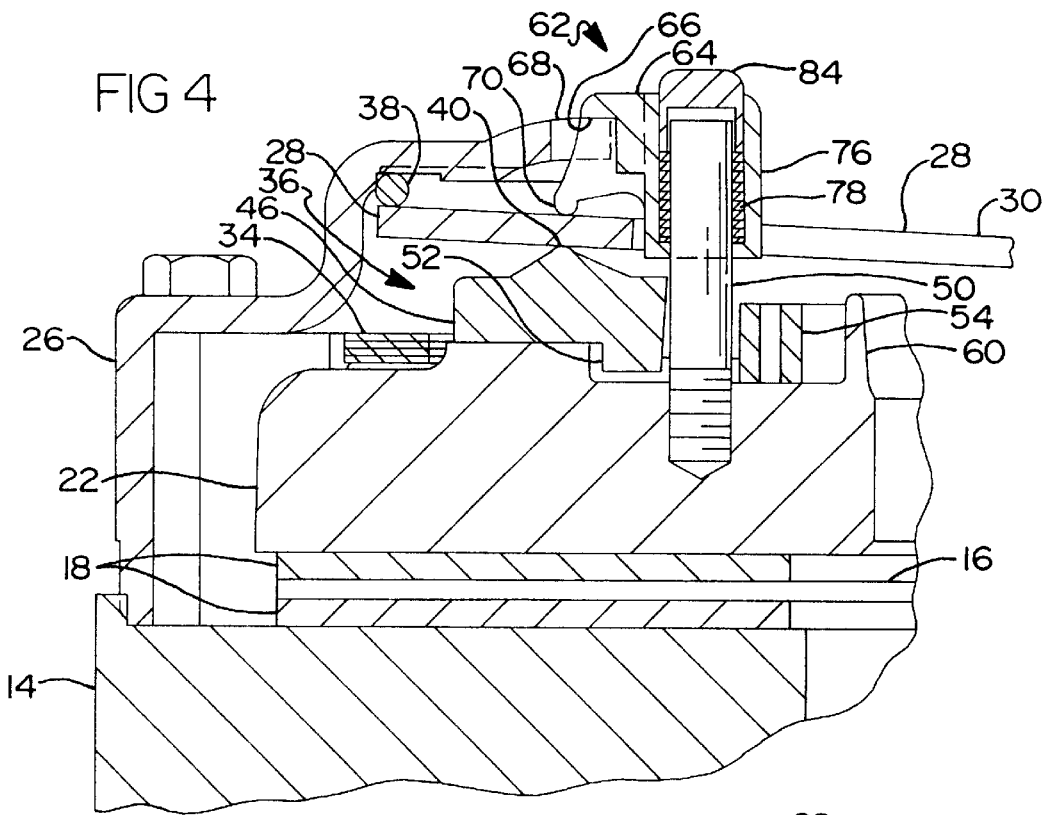
FIG. 4 is an enlarged sectional view of a portion of the clutch of FIG. 1 in the circle 4 in which the clutch is in a first condition.

The invention operates in the following manner. In a new or no-wear condition, as shown in FIGS. 1 and 4, rotating cam 46 is oriented to a first position such that thickness or height H is at a minimum. Friction elements 18 of driven disc 16 are in an unworn condition. Spring engagement tips 70 are in contact with the annular portion of diaphragm spring 28. Wrap spring 78 is in a first position on pin 50, holding ring 64 at a corresponding first position on pins 50. Engagement surface 66 is pressed against bracket 68.

A vehicle operator selectively disengages and reengages clutch 10 by axially displacing release assembly 32 via a pedal operated clutch linkage (not shown). After multiple disengagements and reengagements friction elements 18 wear, decreasing the axial thickness of driven disc 16.

Figure 5:
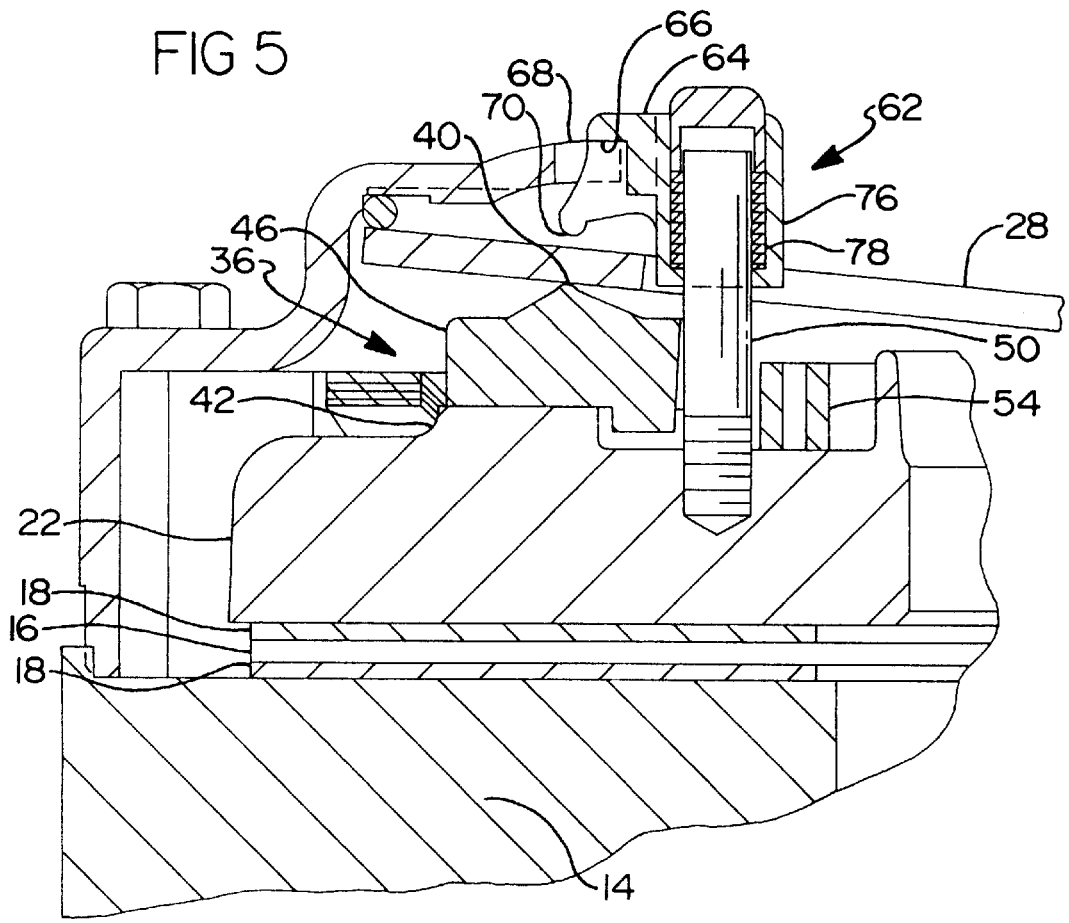
FIG. 5 is a view of the portion of the clutch shown in FIG. 4 in which the clutch is in a second condition.

Clutch 10 is shown in FIG. 5 in a partially worn condition in which no adjustment of adjustment mechanism 36 has yet occurred. Adjustment mechanism 36 is still at the same height H as shown in FIG. 4. Engagement surface 66 is in contact with bracket 68. Pins 50 have slipped relative to springs 78 and cup portion 76 an amount approximately equal to the wear of driven disc 16. Additionally, there is an axial space or gap between spring engagement tips 70 and diaphragm spring 28 approximately equal to the wear of driven disc 16.

FIG. 6 shows the clutch of FIG. 5 immediately after release assembly 32 has been axially displaced to a released position. Pressure plate 22 has moved away from driven disc 16. There is now a gap between engagement surface 66 and bracket 68 which is equal to the axial displacement of pressure plate 22 in moving from the engaged to the released positions. The annular portion of diaphragm spring 28 is now in engagement with tip 70. There is a gap between fulcrum 40 and diaphragm spring 28 which, presuming that cam 46 has not yet begun to move from its position as shown in FIG. 5, is equal to the gap in FIG. 5 between diaphragm spring 28 and tip 70.

Figure 7:
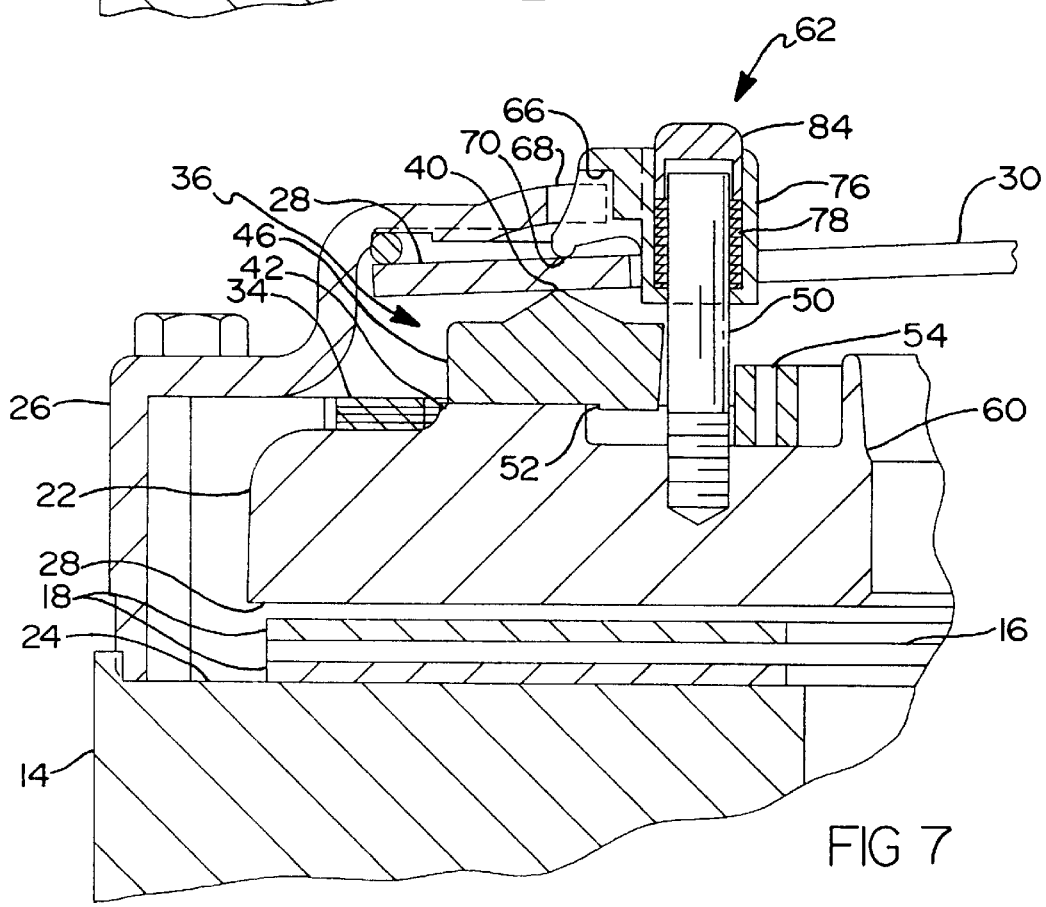
FIG. 7 is a view of the portion of the clutch shown in FIG. 4 in which the clutch is in a fourth condition.

Responsive to the biasing force of spring 54, cam 46 rotates, with the inclined cam surfaces 44 and 48 causing fulcrum 40 to engage diaphragm spring 28 as shown in FIG. 7. It is at this point in the operation of the clutch adjustment mechanism 36 and adjustment limiting mechanism 62 that the limiting mechanism 62 fulfills its purpose. It should be appreciated that this sequence of figures does not necessarily represent the exact sequencing of the operation of the elements. For instance, it is anticipated that cam 46 would begin rotating before release assembly 32 reaches a final released position.

The position of wrap spring 78 on pin 50 does not change with the shift to the released condition, even though a force which causes pressure plate 22 to be axially displaced away from flywheel 14 and driven disc 16 is transmitted through the interface between wrap springs 78 and pin 50. Wrap springs 78 and alignment pins 50 have certain controlling parameters such as diameters, lengths, and spring rates selected so that the force required to axially displace springs 78 along pins 50 is within an optimal range. The optimal range of force is greater than the maximum anticipated release load applied against tips 70 by diaphragm spring 28, but is less than the amount of force applied against fulcrum 40 by diaphragm spring 28 in the engaged condition. The above-described optimal forces associated with pins 50 and wrap springs 78 prevents over adjustment of adjustment mechanism 36. Over adjustment is prevented by causing pressure plate 22 to travel with diaphragm spring 28. Limiting the displacement of diaphragm spring 28 relative to pressure plate 22 during disengagement limits the amount of adjustment of thickness H which can be provided by cam 46 during a single disengagement.

Figure 8:
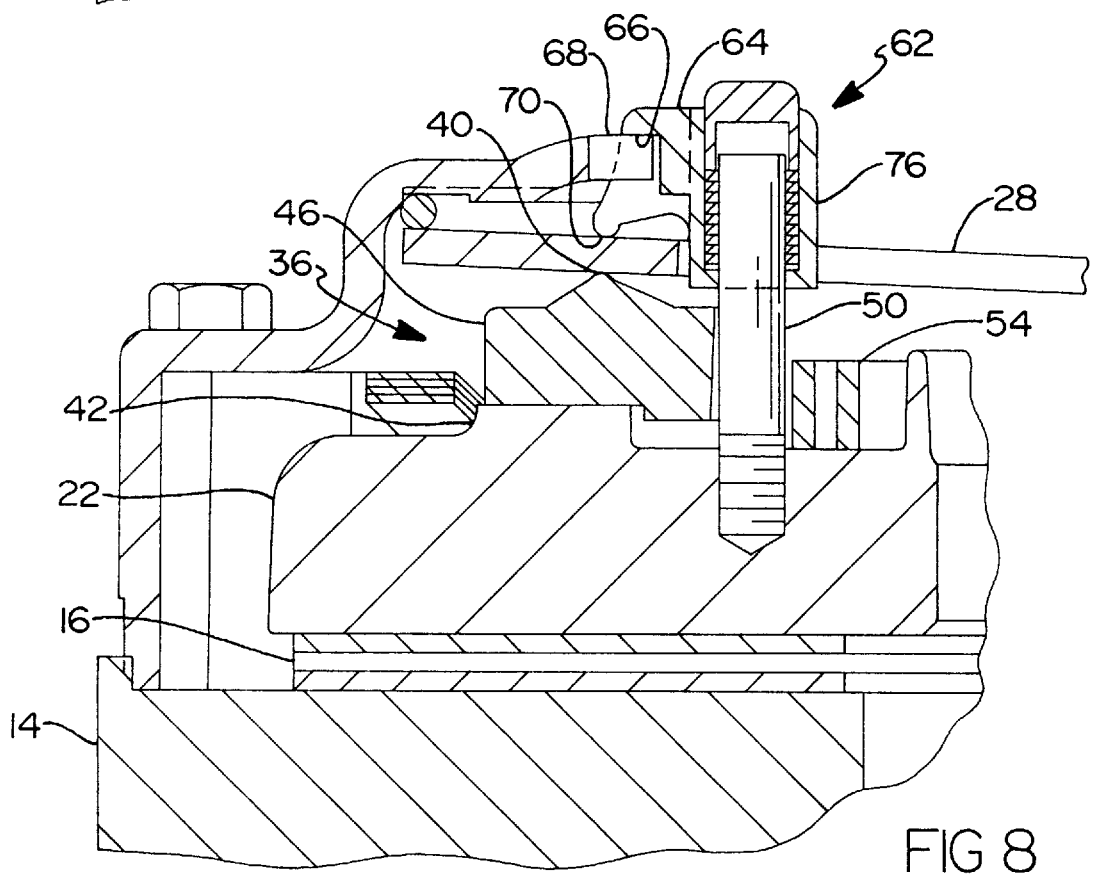
FIG. 8 is a view of the portion of the clutch shown in FIG. 4 in which the clutch is in a fifth condition.

When release assembly 32 is released, allowing clutch 10 to return to an engaged condition as shown in FIG. 8, engagement surface 66 is again in contact with bracket 68. Pin 50 slips slightly, if at all, relative to wrap spring 78, and only in an amount attributable to the wear of driven disc 16 attributable to the reengagement which occurs in that particular reengagement cycle. Diaphragm spring 28 is in engagement with both fulcrum 40 and engagement tips 70.

It should be appreciated that there are readily apparent alternative embodiments to the above-described clutch components For example, the rotating annular cam and the stationary annular cam could be transposed so that it is the stationary annular cam which engages the diaphragm spring. Or, the cams could rotate relative to each other without either cam being stationary relative to the pressure plate or the clutch cover. Also, the cam spring could take the form of a round wire torsional spring instead of a flat wire torsional spring. Or, a tension coil spring could be employed to rotatively bias the rotating cam.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

We claim:

1. An adjustment mechanism for a frictional clutch comprising:

a pressure plate having an axis of rotation and an engagement surface substantially normal to the axis of rotation;

a first annular cam member concentric with the axis of rotation and having a plurality of first ramped cam surfaces and being rotatively fixed with respect to the pressure plate;

a second annular cam member rotatable relative to the first annular cam member and having a plurality of second ramped cam surfaces in engagement with the first ramped cam surfaces and together with the first annular cam member defining an effective pressure plate thickness relative to the engagement surface;

a cam spring connected with the cam member and rotatively biasing the cam members toward an increased cam height; and an adjustment limiting mechanism having
      a first plurality of pins axially extending from a side of the pressure plate opposite the engagement surface,
      an annular adjusting ring concentric with the axis of rotation disposed opposite the cam members from the pressure plate, and
      a first plurality of pin-receiving members fixed to the adjusting ring and slidably receiving the first plurality of pins.

2. An adjustment mechanism as claimed in claim 1 wherein wrap springs are coiled around and in frictional engagement with each of the pins and the wrap springs are axially disposed within the pin receiving members and further wherein the wrap springs resist axial displacement of the adjusting ring relative to the pins.

3. An adjustment mechanism as claimed in claim 1 wherein a plurality of engagement tips are disposed on the adjusting ring.

4. An adjustment mechanism as claimed in claim 2 wherein a plurality of engagement tips are disposed on the adjusting ring.

5. An adjustment mechanism as claimed in claim 3 wherein wrap springs are coiled around and in frictional engagement with each of the pins and the wrap springs are axially disposed within the pin receiving members and further wherein the wrap springs resist axial displacement of the adjusting ring relative to the pins.

6. A frictional clutch for a motor vehicle comprising:

a cover having an axis of rotation;

a pressure plate coupled to the cover for rotation therewith about the axis of rotation and having a frictional engagement surface substantially normal to the axis;

a diaphragm spring interposed between the cover and the pressure plate selectively movable between engaged and disengaged positions and in the engage position biasing the pressure plate to an engage pressured plate position;

an adjusting mechanism having:
      a first annular cam member centered about the axis and axially disposed between the pressure plate and the diaphragm spring,
      a second annular cam member centered about the axis having a plurality of second ramped cam surfaces engaging the first ramped cam surfaces and the engaged cam members being axially disposed between the pressure plate and the diaphragm spring, wherein the engaged cams define an effective thickness of the pressure plate from the frictional engagement surface to an engagement feature of the second annular cam increasing with relative rotation in a first direction,
      a cam spring connected with the cam members and inducing relative rotation therebetween in the first direction, and
      an annular fulcrum concentric with the axis and axially disposed between the adjusting mechanism and the diaphragm spring; and an adjustment limiting mechanism having a first plurality of pins axially extending from a side of the pressure plate opposite the engagement surface;
      an annular adjusting ring concentric with the axis of rotation with the adjusting ring having an engagement surface disposed over a side of the cover opposite the pressure plate, and
      a first plurality of pin-receiving members fixed to the adjusting ring and slidably receiving the first plurality of pins, and a plurality of engagement tips disposed on the adjusting ring and substantially aligned with the annular fulcrum.

7. A frictional clutch for a motor vehicle as claimed in claim 6 wherein wrap springs are coiled around and in frictional engagement with each of the pins and axially disposed within the pin receiving members wherein the wrap springs resist axial displacement of the adjusting ring relative to the pins.

8. A frictional clutch for a motor vehicle as claimed in claim 6 wherein an engagement surface of the adjusting ring engages a radially inwardly extending bracket fixed to the cover when the clutch is in an engaged condition.

9. A frictional clutch for a motor vehicle comprising:

a cover having an axis of rotation;

a pressure plate coupled to the cover for rotation therewith about the axis of rotation and having a frictional engagement surface substantially normal to the axis;

a diaphragm spring interposed between the cover and the pressure plate selectively moveable between engaged and disengaged positions and in the engaged position biasing the pressure plate to an engaged pressure plate position;

an adjusting means for maintaining a constant spring engagement force against the pressure plate in an engaged condition axially disposed between the pressure plate and the diaphragm spring; and an adjustment limiting mechanism including a first plurality of pins axially extending from a side of the pressure plate opposite the engagement surface, an annular adjusting ring concentric with the axis of rotation with the adjusting ring having an engagement surface disposed over a side of the cover opposite the pressure plate, a first plurality of pin-receiving members fixed to the adjusting ring and slidably receiving the first plurality of pins, and a plurality of engagement tips disposed on the adjusting ring in operable engagement with the diaphragm spring.

* * * * *